United States Patent Office 3,134,651
Patented May 26, 1964

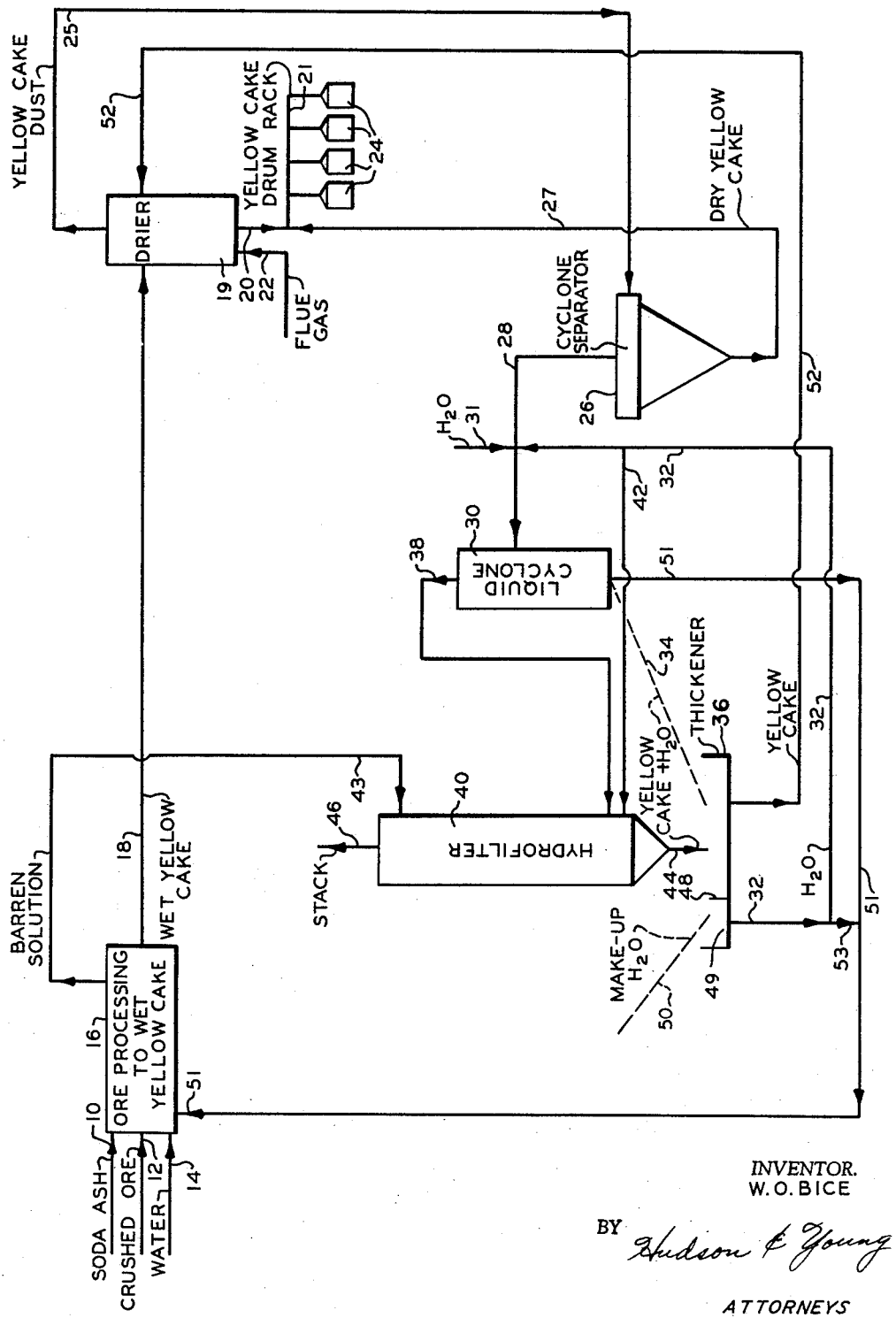

3,134,651
PROCESS AND APPARATUS FOR RECOVERY OF YELLOW CAKE DUST
William O. Bice, Grants, N. Mex., assignor to Phillips Petroleum Company, a corporation of Delaware
Filed Nov. 23, 1959, Ser. No. 854,892
10 Claims. (Cl. 34—11)

This invention relates to a process and apparatus for recovering yellow cake in a uranium ore processing mill.

In the conventional processing of uranium ore the uranium values are concentrated in the form of yellow cake which is the end product of the milling process. The processing steps are well known in the art and are disclosed in the copending application of R. A. Koble, S.N. 830,748, now abandoned, filed July 31, 1959. The wet yellow cake recovered from the final filtering step of the process is passed to a drier for removing residual water and is there contacted with a hot drying gas, such as hot flue gas. The hot flue gas entrains yellow cake dust in substantial quantities which is recovered in part by passing the off-gas from the drier thru a liquid cyclone in admixture with water which forms a slurry in the cyclone. The slurry containing yellow cake dust is passed to a thickener which removes the excess water to produce a wet yellow cake. This wet yellow cake is then passed to the drier, along with the main stream of yellow cake passing thereto.

The off-gas from the liquid cyclone is passed to a hydrofilter wherein it is contacted with aqueous liquid which removes most of the remaining yellow cake dust as a slurry which is passed to the thickener along with the yellow cake slurry from the liquid cyclone. In this method of recovering yellow cake dust, there is a substantial loss of the dust in the off-gas from the hydrofilter and it is desirable to reduce this loss because of the high economic value of this material. In addition, the high concentration of yellow cake in the slurry from the liquid cyclones causes frequent plugging in the lines from these separators to the thickener to which it is passed. Frequent shutdowns are caused by this difficulty.

I have found that the foregoing difficulty is substantially completely eliminated and the loss of filter cake dust is greatly reduced by passing the off-gas from the yellow cake drier thru a gas-solids cyclone separator before passing the gas to the liquid cyclones. The yellow cake recovered in the gas-solids cyclone separator is dry and can be passed directly to the drum rack for packing into the drums, preparatory for shipment, without further-processing.

By removing most of the yellow cake dust in dry form in this manner, the problem of plugging in the effluent slurry line from the liquid cyclones is substantially completely eliminated and, also, the recovery of yellow cake dust is much more complete than the recovery before introducing the dry cyclone separator into the system.

The principal object of the invention is to provide an improved process and apparatus for the recovery of uranium yellow cake in a uranium ore processing mill. Another object is to eliminate plugging in the slurry line between the liquid cyclone and the yellow cake thickener in a uranium mill. A further object is to provide a process and apparatus which increases the recovery of yellow cake from the off-gas of a yellow cake drier. Other objects of the invention will become apparent upon consideration of the accompanying disclosure.

A broad aspect of the invention comprises passing the off-gas from a yellow cake drier in a uranium ore processing plant thru a gas-solids cyclone separator to recover the major portion of the yellow cake dust in dry form, then passing the off-gas from the cyclone separator successively thru a liquid cyclone and a hydrofilter to form a slurry or suspension of yellow cake dust in each of these vessels which is then passed to a thickener for recovery of wet yellow cake, and then returning the recovered wet yellow cake to the drier. The major portion of the yellow cake dust recovered in the cyclone separator is passed directly to the drum rack for packaging for shipment to the consumer without further processing. Aqueous liquid overflowing the secondary thickener is recycled to the primary thickener in the upstream section of the plant and to the lower section of the hydrofilter and a portion may als be recycled to the liquid cyclone to provide the water utilized in these recovery steps. In this manner any uranium values overflowing the secondary thickener are recycled to the recovery steps, thereby contributing to the efficiency of the process.

A more complete understanding of the invention may be had by reference to the accompanying flow diagram illustrating the process of the invention. In this flow, soda ash, crushed uranium ore, and water are passed thru lines 10, 12, and 14, respectively, to ore processing apparatus 16. The ore is processed in conventional manner to produce wet yellow cake which is passed via line 18 to drier 19. The yellow cake is contacted in drier 19 by a suitable hot drying gas, such as flue gas, introduced thru line 22, to drive off the excess moisture and reduce the cake to dry form. The dry cake is passed thru line 20 to conveyor line or drum rack 21 which feeds the dry cake into shipping drums 24. As the drying gas passes thru drier 19, it unavoidably entrains yellow cake dust in sufficient quantities to render its recovery economical.

Instead of passing the off-gas thru the conventional recovery system, it is first passed via line 25 to a dry gas-solid cyclone separator 26 to recover the major portion of the yellow cake dust in dry form for passage thru line 27 to the drum rack. The off-gas from cyclone separator 26 is passed thru line 28 to liquid cyclones 30 in admixture with water from line 31 and/or aqueous liquid introduced thru line 32. Liquid and off-gas are rotated by an impeller in the liquid cyclones so as to separate a slurry containing the major portion of the remaining dust in the off-gas which is passed via line 34 to thickner 36 or to the main yellow cake thickener, via line 51. (A liquid cyclone successfully used in the process is the Oliver Centriclone manufactured by Oliver United Filters, Inc.) The off-gas from cyclone 30 is passed via line 38 to hydrofilter 40 where it is contacted with water and aqueous liquid passed from line 32 thru line 42 into the lower section of the hydrofilter. Barren solution from the carbonating towers of the upstream section of the plant, designated 16, is introduced into an upper section of the hydrofilter from line 43. Intermediate the inlets of lines 42 and 43 in vessel 40, this unit is packed with a filter bed of glass spheres thru which the gas feed ascends and loses most of its suspended solids. (A hydrofilter used successfully in this process is one manufactured by National Dust Collector Corp., No. 5, type IC, rated 6500 c.f.m. of gas at 400° F., 6,500′ altitude containing 25% by volume water vapor at filter inlet.) A slurry of dust is concentrated in the bottom of the hydrofilter and this slurry is passed thru line 44 into thickener 36. Off-gas from hydrofilter 40 is passed thru stack 46 to atmosphere.

The slurry of yellow cake dust recovered in thickener 36 from line 44 and also from line 34, when so desired, is settled and thickened, with the excess liquid flowing over baffle 48 into compartment 49. This aqueous liquid containing a minor proportion of uranium values is admixed with makeup water introduced thru line 50 and the mixture is passed thru line 32 to liquid cyclones 30 and hydrofilter 40 as recited hereinbefore. It is also feasible to add all of the make-up water thru line 31. The yellow cake in moist condition is passed from thickener 36 thru conveyor line 52 to drier 19 where it is dried and passed to drum rack 21.

The process of the invention is in use in a uranium mill in which an average of 570 pounds per day of yellow cake dust pass thru the dust collecting system downstream of the drier. Cyclone 26 recovers approximately 400 pounds per day of the dry yellow cake dust. The liquid cyclones recover about 166 pounds per day of the dust and 3 pounds per day are recovered from the hydrofilter. Before using the invention in the recovery process, four pounds of dust were lost each day thru stack 46. Thus, the invention has reduced the loss of dust thru stack 46 to approximately one pound per day. In addition the difficulty in plugging in slurry lines 44 and 51 has been substantially completely eliminated, thereby greatly increasing the efficiency of the recovery system and eliminating this time consuming problem.

Certain modifications of the invention will become apparent to those skilled in the art and the illustrative details disclosed are not to be construed as imposing unnecesary limitations on the invention.

I claim:

1. Apparatus for recovery of yellow cake dust from the off-gas from a yellow cake drier downstream of a mill producing wet uranium yellow cake comprising in combination a gas-solids cyclone separator having its feed inlet connected by a first conduit with the gas outlet of said drier; a liquid cyclone having its feed inlet connected by a second conduit with the gas outlet of said solid separator and a liquid effluent line from its lower section; an aqueous liquid line connected with said second conduit; a hydrofilter having a gas inlet in its lower section connected by conduit with the gas outlet of said liquid cyclone, a liquid inlet in its upper section, and a liquid effluent line from its lower section; an aqueous liquid feed line connected with the liquid inlet of said hydrofilter; and means for recovering yellow cake from the liquid effluent lines from the lower sections of said liquid cyclone and said hydrofilter.

2. The apparatus of claim 1 wherein said means comprises a yellow cake thickener connected with the liquid effluent lines from said liquid cyclone and said hydrofilter; and conveyor means leading from said thickener to said drier.

3. The apparatus of claim 2 including an aqueous return line from said thickener to the lower section of said hydrofilter for recycling aqueous liquid recovered from said cake in said thickener.

4. The apparatus of claim 3 wherein said return line also connects with the inlet line to said liquid cyclone.

5. In a process for the recovery of yellow cake dust from the off-gas from a yellow cake drier in a uranium mill comprising admixing said gas and a stream of water to form a sludge containing said dust; separating said gas from said sludge in a liquid cyclone separator; passing the off-gas from said separator containing residual dust thru a hydrofilter to recover additional dust; and passing sludge from said separator and sludge from said hydrofilter to a thickener from which resulting wet cake is passed to said drier, wherein there is material loss of yellow cake in the off-gas from said hydrofilter and plugging in the effluent sludge line from said liquid cyclone separator; the improvement comprising passing said gas from said drier thru a gas-solids cyclone separator to recover directly the major proportion of said dust as product before admixing said gas with water, whereby there is substantial reduction in loss of yellow cake in the off-gas from said filter and reduction in plugging in said line.

6. A method for recovering dry yellow cake from wet yellow cake in a uranium recovery process which comprises passing said wet yellow cake into a drier and therein contacting same with a stream of hot drying gas so as to dry said cake, whereby the off-gas from said drier carries entrained yellow cake dust; recovering the dried yellow cake from said drier as product; passing said off-gas thru a gas-solids cyclone separator so as to recover directly the major portion of said dust as product; passing the off-gas from said separator and a stream of aqueous liquid into a liquid cyclone to form and separate a slurry of said dust from said gas; passing off-gas from said liquid cyclone to a hydrofilter to scrub same and recover residual dust in an effluent aqueous slurry; passing said slurries to a thickener to form wet yellow cake and remove aqeous liquid; and passing resulting wet yellow cake to said drier to dry same.

7. The process of claim 6 including the step of passing said aqueous liquid from said thickener to said cyclone.

8. The process of claim 6 wherein barren solution from the yellow cake recovery process upstream of said drier is passed to said hydrofilter above said filter bed as at least a portion of the aqueous scrubbing liquid.

9. The apparatus of claim 1 including a yellow cake receiver; a conveyor line connecting the outlet of said drier with said receiver; and a third conduit connecting the solids outlet of said cyclone separator with said receiver.

10. The process of claim 6 wherein the yellow cake recovered directly from said drier is combined with the yellow cake dust recovered directly from said gas-solids cyclone separator.

References Cited in the file of this patent

UNITED STATES PATENTS

| | | |
|---|---|---|
| 2,090,187 | Credo | Aug. 17, 1937 |
| 2,543,863 | Martin | Mar. 6, 1951 |
| 2,578,315 | Parker | Dec. 11, 1951 |
| 2,845,367 | Alt et al. | July 29, 1958 |
| 2,924,510 | Allen | Feb. 9, 1960 |